(12) United States Patent
Woodruff et al.

(10) Patent No.: US 10,570,892 B2
(45) Date of Patent: Feb. 25, 2020

(54) FIBER-FED ADVANCED PULSED PLASMA THRUSTER (FPPT)

(71) Applicant: CU Aerospace, LLC, Champaign, IL (US)

(72) Inventors: Curtis Woodruff, Savoy, IL (US);
Darren King, Champaign, IL (US);
Rodney Burton, Champaign, IL (US);
David L. Carroll, Champaign, IL (US)

(73) Assignee: CU AEROSPACE, LLC, Champaign, IL (US)

( * ) Notice: Subject to any disclaimer, the term of this patent is extended or adjusted under 35 U.S.C. 154(b) by 0 days.

(21) Appl. No.: 16/436,149

(22) Filed: Jun. 10, 2019

(65) Prior Publication Data
US 2020/0025183 A1     Jan. 23, 2020

Related U.S. Application Data

(60) Provisional application No. 62/684,275, filed on Jun. 13, 2018.

(51) Int. Cl.
*F03H 1/00* (2006.01)
*B64G 1/40* (2006.01)

(52) U.S. Cl.
CPC .......... *F03H 1/0087* (2013.01); *B64G 1/405* (2013.01)

(58) Field of Classification Search
CPC .... F03H 1/0087; F03H 1/0093; F03H 1/0012; F03H 1/00; F03H 1/0006; B64G 1/405; B64G 1/406
See application file for complete search history.

(56) References Cited

U.S. PATENT DOCUMENTS

| 3,159,966 A | 12/1964 | Curtis |
| 3,308,623 A * | 3/1967 | Marchand-Revers ... H05H 1/00 60/203.1 |
| 3,603,089 A | 9/1971 | Esker et al. |

(Continued)

FOREIGN PATENT DOCUMENTS

| CN | 103134391 | 6/2013 |
| CN | 108005869 | 5/2018 |

OTHER PUBLICATIONS

Hideto "A coaxial pulsed plasma thruster using chemical propellants" (Year: 2006).*

(Continued)

*Primary Examiner* — Gerald L Sung
*Assistant Examiner* — William L Breazeal
(74) *Attorney, Agent, or Firm* — Much Shelist, PC; Adam K. Sacharoff (57) ABSTRACT

A Fiber-fed Pulsed Plasma Thruster (FPPT) will enable enhanced low Earth orbit, cis-lunar, and deep space missions for small satellites. FPPT technology utilizes an electric motor to feed PTFE fiber to its discharge region, enabling high PPT propellant throughput and variable exposed fuel area. An innovative, parallel ceramic capacitor bank dramatically lowers system specific mass. FPPT minimizes range safety concerns by the use of non-pressurized, non-toxic, inert propellant and construction materials. Estimates are that a 1U (10 cm×10 cm×10 cm, or 1 liter) volume FPPT thruster package may provide more than 10,000 N-s total impulse and a delta-V of 1.4 km/s delta-V for an 8 kg CubeSat.

12 Claims, 5 Drawing Sheets

(56) References Cited

U.S. PATENT DOCUMENTS

| | | | |
|---|---|---|---|
| 4,233,537 | A | 11/1980 | Limpaecher |
| 4,821,509 | A | 4/1989 | Burton et al. |
| 5,111,656 | A | 5/1992 | Simon et al. |
| 5,924,278 | A | 7/1999 | Burton et al. |
| 6,075,321 | A | 6/2000 | Hruby |
| 6,216,445 | B1 | 4/2001 | Byers et al. |
| 6,300,720 | B1 | 10/2001 | Birx |
| 6,318,069 | B1 | 11/2001 | Falce et al. |
| 6,336,318 | B1 | 1/2002 | Falce et al. |
| 6,373,023 | B1* | 4/2002 | Hoskins ............... H05H 1/54 219/121.52 |
| 6,378,290 | B1 | 4/2002 | Killinger et al. |
| 6,449,941 | B1 | 9/2002 | Warboys et al. |
| 7,530,219 | B1* | 5/2009 | Burton ............... F03H 1/0087 60/202 |
| 7,926,257 | B1 | 4/2011 | Burton et al. |
| 7,926,258 | B1 | 4/2011 | Burton et al. |
| 10,047,731 | B2 | 8/2018 | Deshpande et al. |
| 10,176,930 | B2 | 1/2019 | Eidelman et al. |
| 2017/0211554 | A1* | 7/2017 | Childress ............... B64G 4/00 |

OTHER PUBLICATIONS

CU Aerospace, LLC, Fiber Fed Advanced Pulsed Plasma Thruster (APPT), NASA SBIR Online Abstract, Apr. 19, 2017 : https://sbir.nasa.gov/SBIR/abstracts/17/sbir/phase1/SBIR-17-1-Z8.01-9758.html.

CU Aerospace, LLC, Fiber-fed Advanced Pulsed Plasma Thruster (FPPT), NASA SBIR Online Abstract, Mar. 4, 2018 : https://sbir.nasa.gov/SBIR/abstracts/17/sbir/phase1/SBIR-17-2-Z8.01-9758.html.

PCT Search Report, dated Oct. 11, 2019, PCT/US2019/036927, CU Aerospace, LLC—Applicant.

Translation CN103134391, European Patent Office online translation retrieved Oct. 11, 2019.

Translation CN108005869, European Patent Office online translation retrieved Oct. 11, 2019.

* cited by examiner

FIBER-FED ADVANCED PULSED PLASMA THRUSTER (FPPT)

CROSS-REFERENCE TO RELATED APPLICATIONS

The present invention claims priority to U.S. Provisional Application 62/684,275 filed Jun. 13, 2018, hereby incorporated in its entirety by reference.

BACKGROUND OF THE INVENTION

While the classic pulsed plasma thruster (hereinafter "PPT") propulsion system technology is mature, it has historically been limited by its high mass and small propellant load to precision pointing and small delta-V applications. The PPT has a technology readiness level (TRL) of 9, having flown on several spacecraft beginning with the Soviet Zond 2 mission in 1964, accumulating over 30 thruster years in space through 1991. The LES 8/9 PPT was not flown but demonstrated $34 \times 10^6$ pulses during development and flight qualification. More recently (2000-2017), the PPT was employed for pitch control on the Earth Observing 1 (EO-1) spacecraft. The principal use of these PPTs has been for attitude control and precision orbital adjustments including stationkeeping, but not for primary propulsion applications such as orbit change and de-orbiting. Extensive flight experience demonstrates that technical risk areas such as pulse electromagnetic interference, exhaust condensation and system life have been successfully mitigated, supporting a TRL 9 rating.

An attempt at higher impulse PPT applications was an Air Force Rocket Propulsion Laboratory/Fairchild Industries program, which concluded in 1977; this project was devoted to developing the PPT for stationkeeping of 500 kg-class satellites, producing a one-millipound (4.4 mN) PPT with an impulse capability of 166,000 N-s from 10.6 kg of PTFE (Teflon™) propellant. The twin rectangular propellant bars were stored as opposed helices, and the pillbox-shaped thruster envelope had a volume of ~85 liters, with a total estimated system mass, including 10 kg of high voltage capacitors, of 24 kg. The self-field $\vec{j} \times \vec{B}$ device generated thrust between plane parallel electrodes through a side exhaust nozzle from 450 J pulses at 0.20 Hz, at a mean thruster power of 90 W. System specific mass was $\alpha=210$ kg/kW. The PPU mass was 2.4 kg, and the PPU specific mass was high at ~15 kg/kW. A question remains as to the accuracy of the specific impulse, as was claimed as 2200 seconds, and did not include eroded electrode mass in the calculation. The one-millipound thruster demonstrated that the Teflon PPT can generate very high total impulse, with a volumetric impulse of 2700 N-s/liter, but did not demonstrate low specific mass (kg/kW).

Historically, pulsed plasma systems have targeted small delta-V applications such as attitude control. With Applicant's Fiber-fed Pulsed Plasma Thruster (hereinafter "FPPT") and its innovative propellant feed and storage system, the FPPT is projected to outperform previous state of the art PPT systems, as well as newer technologies, With an anticipated >5,000 N-s total impulse from a 1U system, and a 1U mass of <1.5 kg, 100 s of km orbit transfers and inclination changes of tens of degrees are now available to smaller satellites. The intrinsic safety of FPPT and its inert, unpressurized PTFE propellant position it as a prime candidate for secondary payload missions where costs and logistics are dominated by range safety concerns. The solid propellant has no handling, storage, or operational restrictions. The ease of handling and storage for the solid propellant can extend operation to planetary missions with no additional monitoring or controls. FPPT system unit costs are anticipated to be significantly below competing liquid or gas-fed CubeSat propulsion systems.

Specific goals stated in NASA's 2015 Roadmap In-Space Propulsion Technologies Technical Areas 2.1.1, Chemical Propulsion, and 2.1.7, Micropropulsion, are "Enhance current missions and open up new mission opportunities through improvements in performance, manufacturability, durability, and cost", "Develop engines that operate on non-toxic storable propellants", and "Develop compact and lightweight systems with high precision control capability." Applicant's FPPT propulsion system responds directly to these goals with a focus on high total impulse performance with cost reduction through common commercial-off-the-shelf (COTS) materials of construction.

Commercial interest in very small satellites continues to grow in the 1-500 kg satellite sector. Moving forward, it is more important than ever that these satellites have access to propulsion systems to extend their asset time on orbit. The FPPT system offers CubeSats and larger small satellites a significant propulsion capability with high impulse per unit volume. The Teflon propellant has no handling, storage, and operational restrictions, FPPT will require no safety equipment for storage, transportation, integration, and testing, and place no demanding requirements on the launch provider, making it an ideal low-cost solution for industry, research, and academic small-satellite propulsion needs.

Potential CubeSat and nanosatellites missions with FPPT include low Earth orbit raising and/or deorbiting. FPPT would improve mission affordability for multiple CubeSats, since several CubeSats with FPPT could be launched from a single low-cost booster and maneuvered to other orbits, then later de-orbited. The FPPT thruster will provide a compact, low mass, non-hazardous propulsion technology solution that will be made available in a family of sizes by changing the propellant spool volume to meet the differing needs of users in NASA, DOD, industry, and universities for CubeSat and small-satellite missions.

SUMMARY OF THE INVENTION

Figure 1:
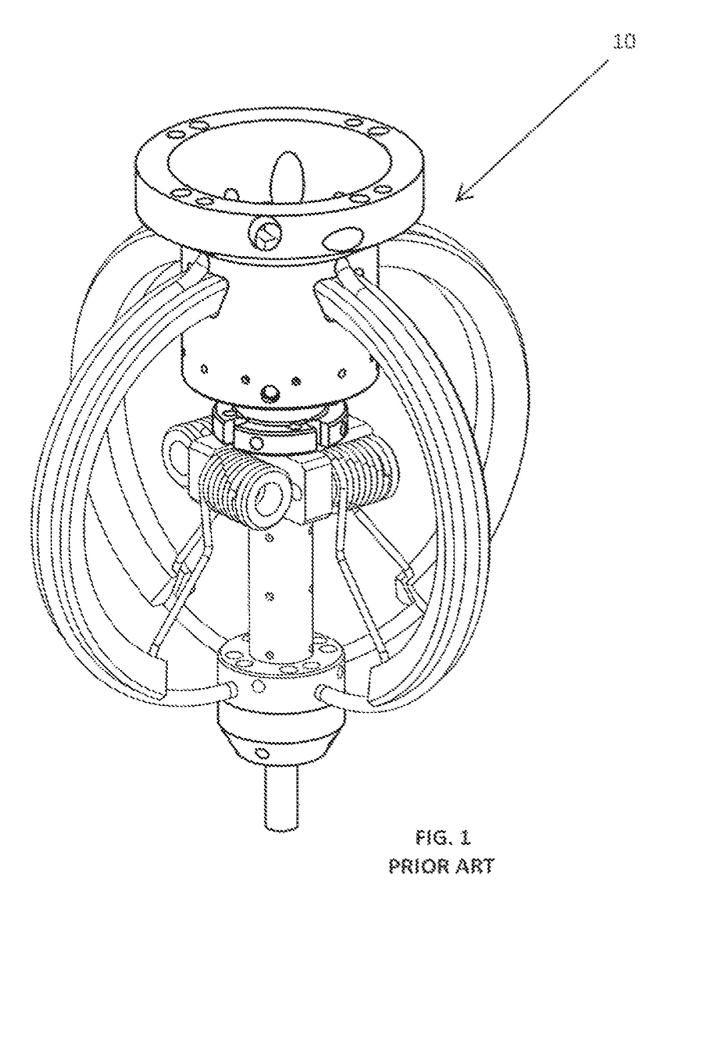
FIG. 1. Prior Art photograph of Applicant's PPT-11 coaxial pulsed plasma thruster without the associated massive (6800 g) capacitor bank having lsp˜1200 s, specific thruster dry mass >100 kg/kW, and relatively low propellant storage mass of 54 grams.

While classic PPT technology is mature, it has historically been limited by its size and propellant load, for example Applicant's prior PPT-11 technology, FIG. 1 [as shown and patented in Applicant's U.S. Pat. Nos. 7,530,219 B1, 7,296,257, and 7,926,258 Thruster 10]. Technology advances in the past 20 years can now be applied to the Teflon™ PPT to create the innovative FPPT, making several significant improvements to the classic PPT technologies.

The present invention is directed to a Fiber-fed Pulsed Plasma Thruster (FPPT). The thruster replaces the spring-fed state of the art Teflon feed system with a motor-driven fiber feed system, which pulls a flexible Teflon fiber from a spool. Additionally, an innovative, highly parallel ceramic capacitor bank dramatically lowers system specific mass.

The Fiber-fed Pulsed Plasma Thruster (FPPT) will enable low orbit, cis-lunar and deep space missions for small satellites, FPPT technology utilizes a motor to feed PTFE fiber to its discharge region, enabling class-leading PPT propellant throughput and variable exposed fuel area. An innovative, highly parallel ceramic capacitor bank dramatically lowers system specific mass. FPPT is inherently safe; its non-pressurized, non-toxic, inert propellant and construction materials minimize range safety concerns. Estimates are that a 1-liter (10 cm×10 cm×10 cm, or 1U) volume FPPT thruster package may provide as much as 10,000 N-s total impulse, enabling 1.4 km/s delta-V for an 8 kg CubeSat. Applicant is presently developing a 1U integrated system including the advanced thruster head with igniter system, PTFE fiber feed system, power processing unit, and control electronics.

Numerous other advantages and features of the invention will become readily apparent from the following detailed description of the invention and the embodiments thereof, from the claims, and from the accompanying drawings.

BRIEF DESCRIPTION OF THE FIGURES

The patent or application file contains at least one drawing executed in color. Copies of this patent or patent application publication with color drawing(s) will be provided by the Office upon request and payment of the necessary fee. A fuller understanding of the foregoing may be had by reference to the accompanying drawings, wherein.

DETAILED DESCRIPTION OF THE INVENTION

Figure 2A:
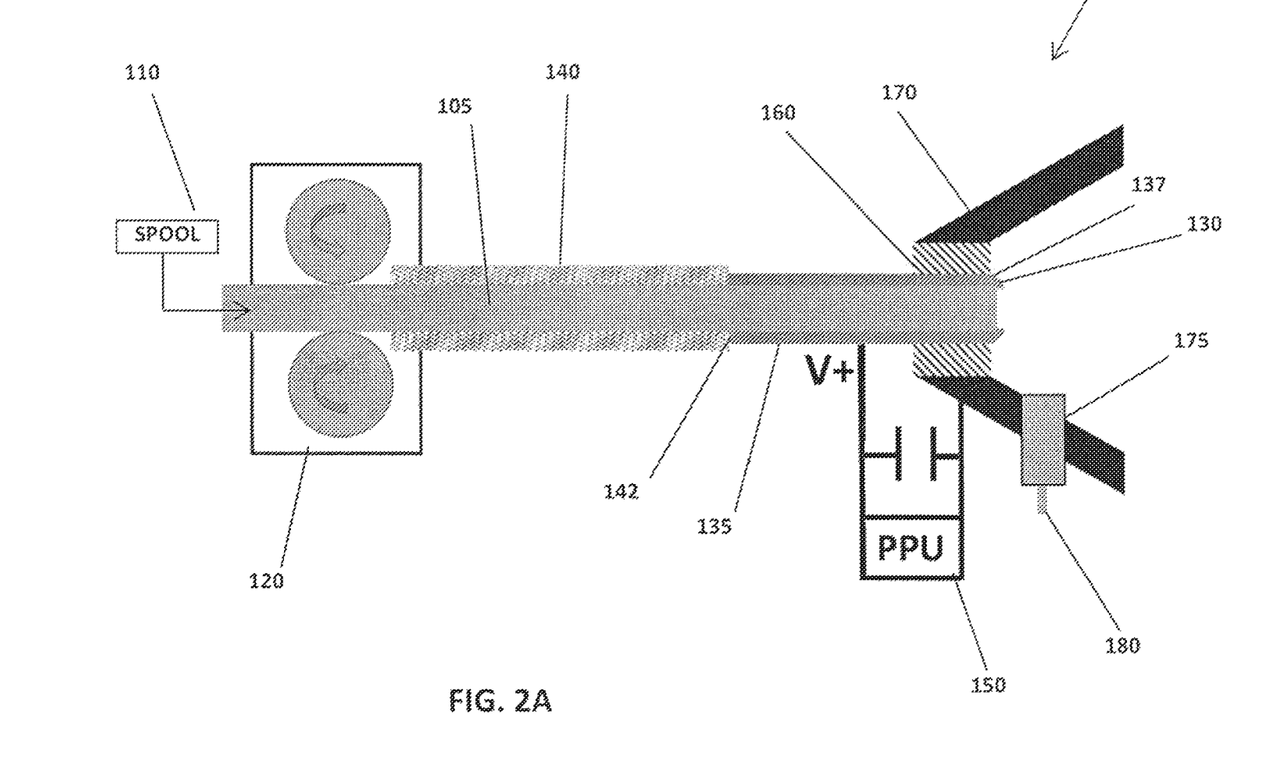
FIGS. 2A and 2B. An Embodiment of an FPPT concept schematic.
Figure 2B:
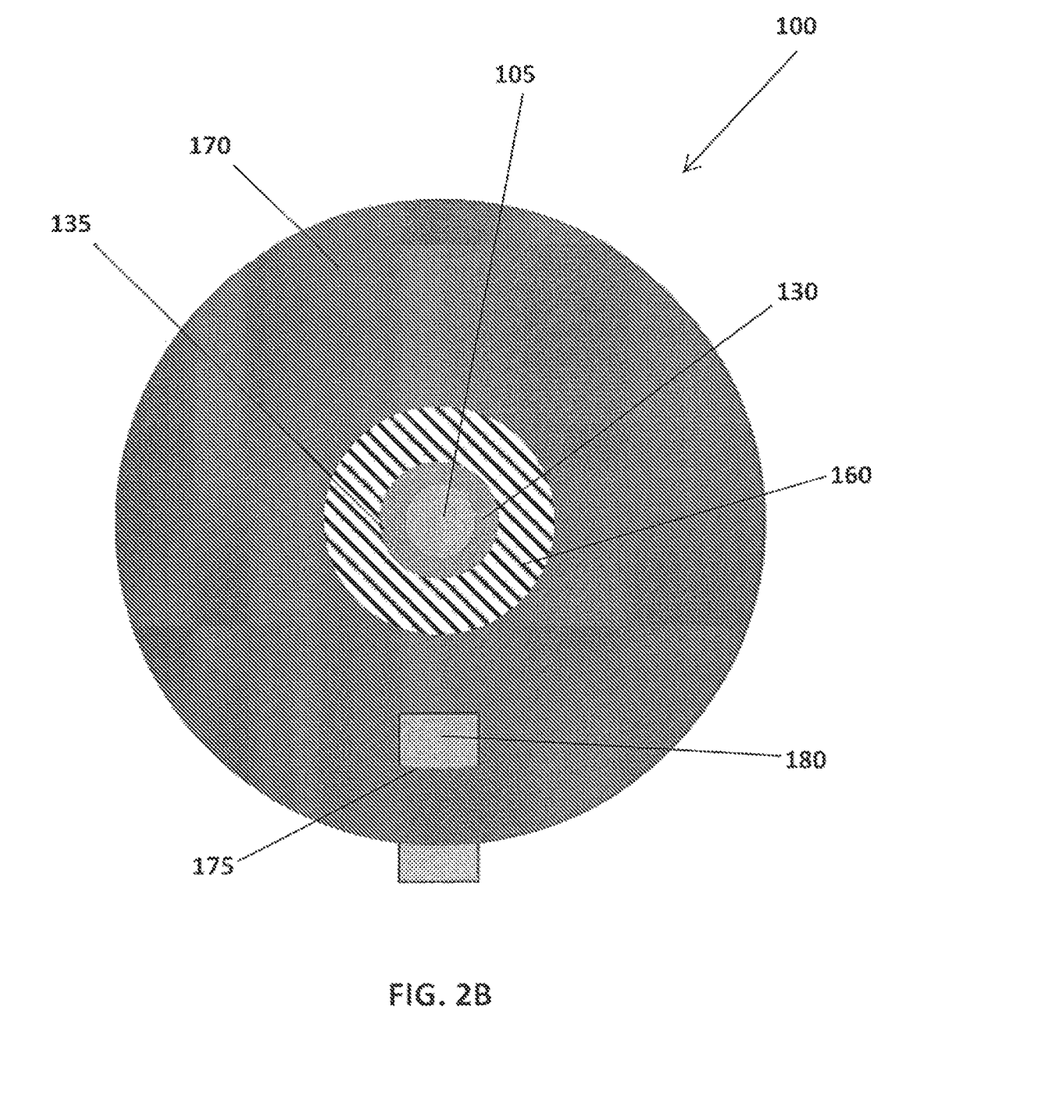

A schematic of one embodiment of Applicant's Fiber-fed Pulsed Plasma Thruster (FPPT) generally referenced as element 100 is shown in FIGS. 2A and 29. The thruster 100 replaces the spring-fed state of the art Teflon feed system with a fiber feed system, which pulls a Teflon fiber 105 from a spool 110. Prior Art PPT feed systems use a spring to push a propellant bar against a stop without ablation rate control, and this embodiment of the FPPT employs a pulsed stepper motor 120 to drive the fiber 105 against a stop 130 at the tip of a centered anode 135. This system retains a fixed anode/propellant geometry as propellant is consumed. Because of the feed stop 130, it may be necessary to incorporate a slip clutch in the drive mechanism, or to monitor step motor current for a stall. A stall condition will initiate a pause in the feed command, followed by a resumption in feed after an empirically-determined number of pulses.

In greater detail of FIGS. 2A and 2B, the Teflon fiber 105 is wound on a spool 110. The feed motor 120 (stepper or other motor) drives or pulls the fiber 105 from the spool 110 into an insulated feed tube 140. The fiber 105 is fed through the feed tube 140 into the tubular centered anode 135. The centered anode 135 is cylindrically shaped and configured against an end 142 of the feed tube 140 to ensure the fiber 105 properly feeds through the anode 135. The anode 135 is electrically connected to a power processing unit ("PPU") 150. The exit end or tip 137 of the anode 135 includes the stop 130, which may be configured as a radially inward flange. An insulator 160 is positioned near the stop 130 and insulates the anode 135 from a cathode 170. The insulator 160 may contain circumferential labyrinthal grooves in the outer diameter so as to trap solid carbon particles from the dissociated PTFE and prevent surface flashover along the exposed faces of the insulator 160 between the anode and cathode during capacitor charging and before the igniter is fired. The cathode 170 may be connected to the PPU 150, either by direct connection or through a high ohmic value standoff resistor. The cathode 170 also may have a preferred shape as a divergent nozzle. Lastly, an igniter 180 is fitted through an opening 175 in the cathode, and may be directly connected to the cathode, or may be connected to the cathode through a resistive or inductive standoff pedance.

In operation, the motor pulls fiber fuel from the spool and feeds it through the feed tube into the anode. The fiber fuel will be fed to the end of the anode at the stop 130. When the igniter pulse is triggered it expels electrons into nozzle region which are attracted to the positively charged anode, consequently triggering the primary high energy discharge to ignite between the anode 137 and cathode 170, thereby creating a radiative plasma that heats and vaporizes the surface of the fiber propellant, allowing the discharge to create a dissociated and partially ionized plasma that will be electromagnetically and electrothermally accelerated outward from the nozzle to produce thrust. As the exposed surface of the fiber fuel ablates away, the motor is controlled to feed more fiber to the stop 130.

While classic PPT technology is mature, it has historically been limited by its size and propellant load for example Applicant's prior PPT-11 technology, FIG. 1 [U.S. Pat. Nos. 7,530,219 B1, 7,296,257, and 7,926,258]. Technology advances in the past 20 years can now be applied to the Teflon™ PPT to create the innovative FPPT, making several significant improvements to the classic PPT technologies:

Coaxial Geometry.

A high $l_{sp}$ thruster using a cathode design similar to the PPT-11 thruster, FIG. 1, but incorporating a motor-driven fiber-fed feed system that feeds Teflon fiber through the anode to achieve high throughput, FIGS. 2A and 2B. The coaxial PPT-11, generated 1.7 mN at 1200 s $l_{sp}$, using an axisymmetric discharge with a conical nozzle cathode and central anode, with the propellant fed radially through the cathode. The coaxial geometry collapses the discharge volume and raises the plasma conductivity and thruster efficiency. The thrust is generated 65-75% electromagnetically from $\vec{j} \times \vec{B}$ (high $l_{sp}$), with the remainder being generated electrothermally (lower $l_{sp}$). The cathode locates the igniter plug that sprays electrons toward the central anode to initiate the discharge at a rate of 1-20 pulses per second. Applicant has now demonstrated performance similar to the PPT-11 with the FPPT, reaching 87% electromagnetic (EM) thrust.

Figure 3:
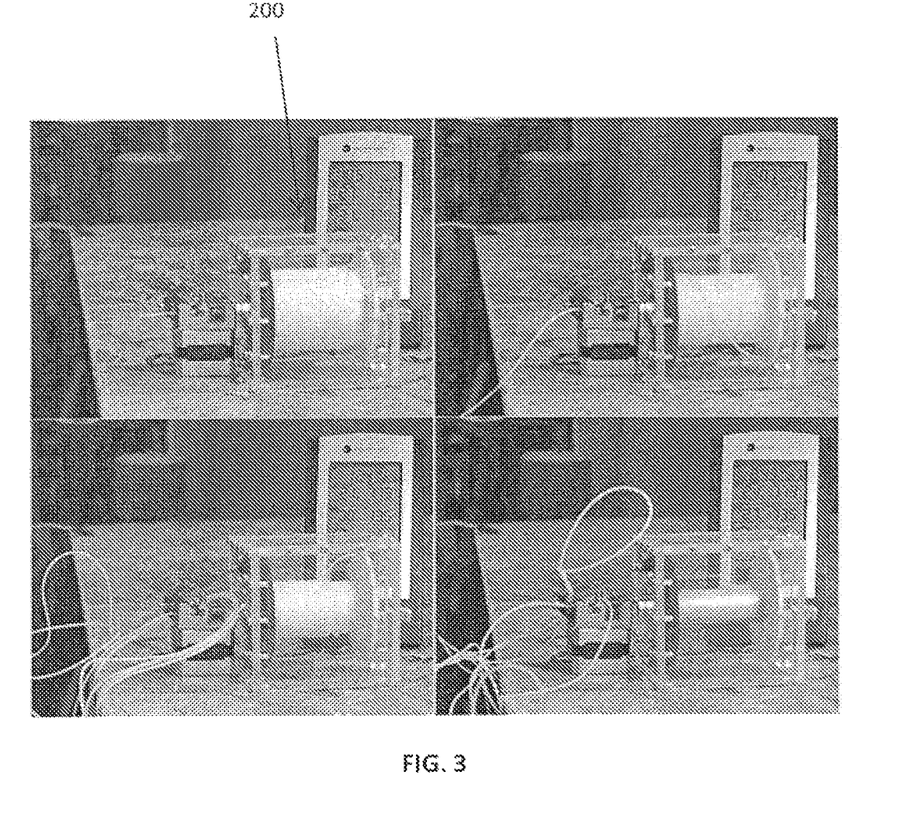
FIG. 3. Motor-driven feed system demonstrator and fiber propellant spool placed in a 1U volume; sequence of photographs shows a spooled fiber with a fiber mass of 170 g in upper left to completely fed (emptied) spool in lower right.

Fiber feed system. The design of the PPT Teflon feed system has always been a challenge for high throughput PPTs, as observed with the large (85 liter) envelope for the AFRPL/Fairchild millipound (4.4 mN) thruster, and the small geometry-limited propellant mass for the coaxial PPT-11 (FIG. 2). Recent technology developments by Applicant have shown that a propellant fiber can be reliably fed from a high-capacity static spool using a motor-driven fiber feed system adapted from 3D printer technology, FIG. 3, Feed System 200. A commercial-off-the-shelf (COTS) stepper motor and drive setup (Anycubic MK8 Extruder) was used for testing, and a preliminary flight configuration was designed for implementation that matches its torque and feed rates. (Note that other motors can be used for FPPT.) The same COTS system was used for the FPPT PTFE fiber feed. For the coaxial FPPT, the fiber is fed through the center of the central anode. The packing factor for fiber on the spool system was measured at 90%, and with the PTFE density of 2.2 kg/liter, high propellant mass can be stored at higher density and lower mass than can competing gas and liquid propellants using tanks.

High Voltage Capacitors.

Improvements in capacitor technology, specifically the mica dielectric, have not significantly improved specific mass or volume, but have significantly lowered equivalent series resistance (ESR), with two major benefits: (1) low ESR increases pulse current, raising $\vec{j} \times \vec{B}$ and efficiency; (2) low ESR permits a reduction in capacitance and discharge energy, compensated by as much as an order-of-magnitude increase in pulse rate, with capacitor mass correspondingly reduced. Reductions in capacitor mass also reduce circuit inductance, raising current and also $\vec{j} \times \vec{B}$ thrust. A typical PPT-11 current pulse (FIG. 4) was 30 kA with half-period of 8 μs. PPT-11 used a bank of 4×20.5 μF, 1.7 kg, low ESR mica capacitors developed by Unison Industries. Multi-layer ceramic capacitors (MLCC), a more recent development, are a robust, low mass and low-volume option for primary energy storage.

Ignition System.

Prior PPT ignition was based on a fast pulse delivered to a semiconductor igniter plug developed for gas turbine ignition. Igniter circuit switching has improved from vacuum gaps to silicon-controlled rectifiers to MOSFETs, with the latter depending on the availability of higher voltage devices.

Power Processing Unit (PPU).

The PPU for the FPPT will supply a nominal 1 kV charging current source to the capacitors, a pulse to the igniter plug, and low voltage current to the feed system motor. High power electronics technology and higher voltage operation have allowed reductions in PPU specific mass, so that 3 kg/kW (3 g/W) at 94% efficiency was achieved in 2001. Modern PPU specific mass is estimated at <2 kg/kW; for example, Applicant's 40 W CHIPS PPU is just under 40 grams (1 kg/kW), Ppt Physics.

The time-dependent heating and sublimation of the Teflon surface during and after the pulse is now well understood and is used to predict pressure decay time in the inter-electrode region. Experimental PPT measurements of Antonsen were in agreement with the plasma modeling of Keidar and Boyd. The combined effect of mixed $\vec{j} \times \underline{B}$ and electrothermal acceleration on PPT performance is now well understood using a two-fluid model as developed by Burton. Unlike all previous PPTs, preliminary analysis of the FPPT predicts operation in a $\vec{j} \times \vec{B}$ pinch mode near the central anode, resulting in regions of a zero value of electron Hall parameter and high ion current on-axis and high values of electron Hall parameter off-axis, with ion-neutral charge exchange an important aspect of the physics.

Several factors result in increasing system performance:

Pulse Energy.

Higher pulse energy raises efficiency, A robust 40 J or higher design is desired.

Total Thruster Power Available.

Using an energy storage battery, high power small satellite thruster systems appear possible, We consider a nominal FPPT power level to be 40-80 W at a pulse rate of a few Hertz. This is a power level comparable to the Busek Bit-3 ion thruster.

Pulse Shape.

Pulse shape is controlled through capacitance, inductance, and circuit resistance. The design goal is 30 kA peak current and a several μs pulse half-period.

Capacitor Life.

PPT-11 used a 6.8 kg bank of Unison Industries mica capacitors rated at Vmax=1850 V but only charged to 1300 V. The life of ceramic caps scales inversely as the nth power of charging voltage [L~(Vmax/V)$^n$] where n is typically 10±3. Appropriate voltage ratings for ceramic caps are chosen through testing to ensure a high life cycle safety factor in capacitor operation.

Pulse Rate and Throttling.

By controlling pulse rate, energy per pulse, and propellant feed rate, the 1U FPPT system is fully throttleable over 0400% thrust.

ESR. Equivalent series resistance becomes a limiting factor as the size of the capacitor bank is reduced. An efficient PPT needs to operate at a total impedance of ~10-15 mΩ, so that ESR<<1 mΩ is needed to keep capacitor heating to a few percent of the power input.

Peak Current.

Figure 4:
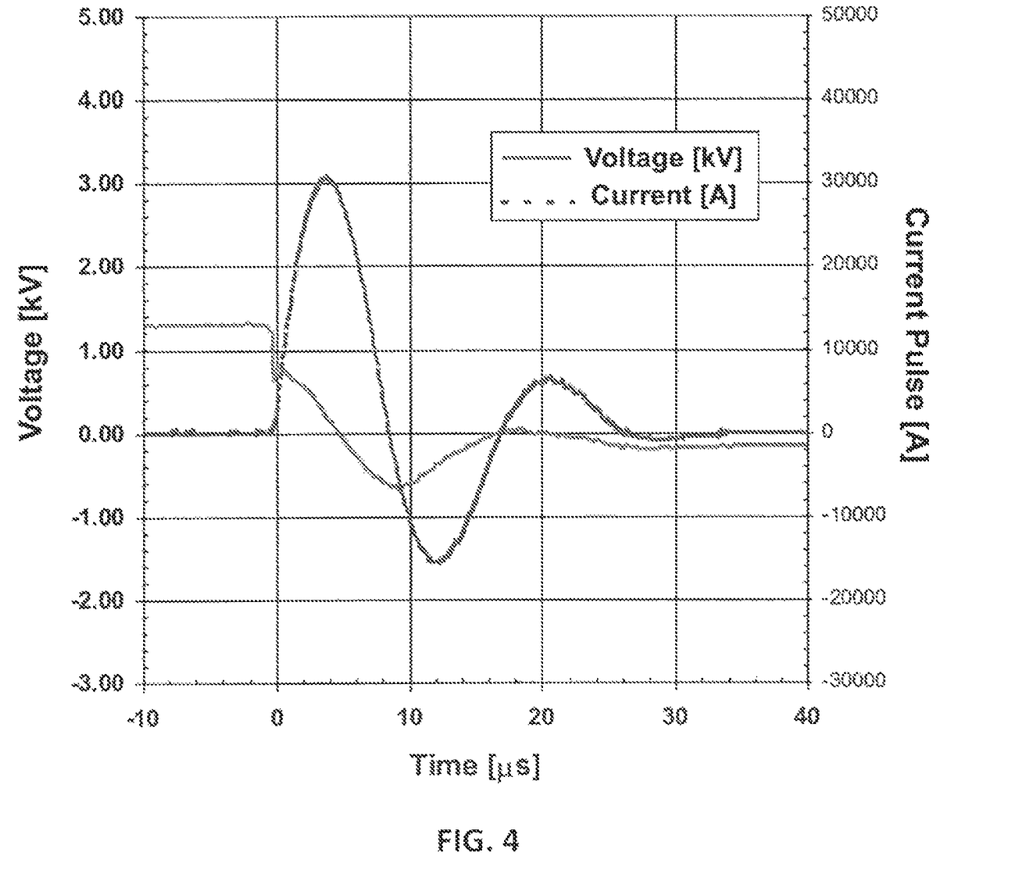
FIG. 4. Typical PPT-11 30 kA current pulse.

PPT-11 peak current was 30 kA, with thrust having both a major electromagnetic and a minor electrothermal component, quantified by β=electromagnetic thrust/total thrust. It has been determined theoretically and experimentally that PPT efficiency increases as β increases. The electromagnetic impulse bit is given by $$I_{bit} = \frac{\mu_o}{4\pi} \int I^2 dt \left[ \ln\left(\frac{r_c}{r_a}\right) + \frac{1}{2} \right]$$

and total thrust is measured on the thrust stand. The pulse current scales as $V/(L/C)^{1/2}$, where L is the circuit inductance and the circuit is impedance-matched to the discharge to minimize ringing (FIG. 4).

Ambient Pressure.

PPT operation requires low pressure in the electrode gap at the time that cap voltage is applied to prevent an unwanted breakdown. Post-pulse sublimation from the propellant face produces a decaying pressure profile, which requires several milliseconds to disperse. This time constant places an upper limit on pulse rate of the order of 100 pps.

Igniters.

The igniter materials and possible geometry design adjustments can be implemented to achieve a goal of greater than 10 million pulses with a single or multiple igniter. If a single igniter cannot achieve this goal, then multiple igniters can be used in an alternating firing sequence. A >100% life cycle test is desired to reduce risk and clearly demonstrate reliable long-term operation; this corresponds to >10 million pulses with a single FPPT unit, Multiple igniters can also be implemented for redundancy, and to reduce required pulse count per igniter by at least a factor of 2. Testing is used to determine the appropriate path towards developing igniters with the capability of several tens of millions of pulses.

Materials and Geometry Optimization.

Multiple anode materials can be tested to minimize anode erosion without comprising performance. Anode development is critical, because the desired anode has a small diameter, yet must contain the fiber, expose the fiber to the discharge, and be sufficiently robust to tolerate erosion. Feed configurations and materials will be tested for reliability and electrode loss. Two or more different geometries of the cathode cone will be investigated to minimize the volume envelope of the thruster-head and optimize the EM thrust term ($r_c/r_o$) while maintaining (or improving) overall thruster performance. Careful consideration should be given to the fabrication (manufacturability) of the anode material and cone geometry. To verify comparison and evaluation, thrust stand testing should be performed.

Performance Estimates

Table 1 shows the estimated packaged performance parameters for a typical 1U FPPT system. A 1-liter (10 cm×10 cm×10 cm, or 1U) volume FPPT thruster package may provide 10,000 N-s total impulse, enabling 1.4 km/s delta-V for an 8 kg CubeSat,

TABLE 1

Estimated FPPT performance for a 1U FPPT system.

| Item | FPPT Performance |
| --- | --- |
| Propulsion system volume | 1000 cc |
| System lifetime | Not propellant limited |
| Spacecraft temperature range | Not propellant limited |
| Propellant storage volume | 440 cc |
| Propellant | PTFE Teflon fiber |
| Propellant mass consumed | 880 g |
| Total propulsion wet mass | 2000 g |
| Spacecraft propulsion power | 75 W |
| Specific Impulse | 1200 s |
| Primary thrust | 1.3 mN |
| Nominal mass flow rate | 0.111 mg/s |
| Total impulse | 10,300 N-s |
| Volumetric impulse for 1000 cc | 10,300 N-s/liter |
| Total thrust time @ nominal conditions | 2200 hr |
| Spacecraft ΔV 1U 8 kg | 1370 m/s |

While elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

We claim:

1. A pulsed plasma thruster comprising:
   a spool having a fiber propellant wound thereon;
   a stepper motor in communication with the fiber propellant to pull the fiber propellant from the spool;
   an insulated tube configured to have one end of the insulated tube in communication with the stepper motor such that the fiber propellant is fed into the insulated tube;
   an anode bored through and having one end of the anode in communication with the insulated tube, such that the fiber propellant travels through the anode, the anode having an exit end defined with a flange extending radially inward configured to create a stop between an edge of the flange and the exit end of the anode, wherein the fiber propellant fed through the anode stops at the stop;
   a coaxial insulator positioned about the exit end of the anode;
   a cathode connected to the coaxial insulator, the cathode having an interior profile shaped into a nozzle region; and
   an igniter fitted through an opening in the cathode, wherein when the igniter is pulsed, the igniter is configured to expel electrons toward the anode to ignite a primary high current, high magnetic field discharge between the anode and the cathode thereby creating a plasma that vaporizes the fiber propellant at the stop thereby generating vaporized fiber propellant, and wherein the vaporized fiber propellant combines with the high current, high magnetic field discharge to create a partially ionized gas, wherein the partially ionized gas is electromagnetically and electrothermally accelerated outward from the nozzle region to produce thrust, and wherein as the fiber propellant vaporizes the stepper motor feeds more fiber propellant from the spool to the stop.

2. The pulsed plasma thruster of claim 1 further comprising a power processing unit electrically connected to the anode and to the cathode.

3. The pulsed plasma thruster of claim 2, wherein the power processing unit is electrically connected in parallel to a capacitor bank and to the anode and the cathode and wherein the capacitor bank is configured to lower an equivalent series resistance and therefore raising pulse current and j×B thrust.

4. The pulsed plasma thruster of claim 3, wherein the capacitor bank includes a plurality of low mass multi-layer ceramic capacitors formed in a parallel configuration to increase capacitance while maintaining low equivalent series resistance.

5. The pulsed plasma thruster of claim 1, wherein the propellant fiber is made of polytetrafluoroethylene.

6. A pulsed plasma thruster comprising:
   a fiber propellant feed system including a motor configured to pull a fiber propellant from a spool and feed the fiber propellant into a centrally located anode and towards a stop defined at an end of the centrally located anode;
   a cathode insulated from the centrally located anode;
   an igniter fitted through an opening in the cathode, wherein when the igniter is triggered, the igniter is configured to expel electrons into a nozzle region to ignite a primary high energy discharge between the centrally located anode and the cathode thereby creating a plasma that vaporizes the fiber propellant at the stop thereby generating vaporized fiber propellant, and wherein the vaporized fiber propellant combines with the primary high energy discharge to create a partially ionized gas, wherein the partially ionized gas is electromagnetically and electrothermally accelerated to produce thrust, and wherein as the fiber propellant vaporizes the motor feeds more fiber propellant from the spool to the stop.

7. The pulsed plasma thruster of claim 6 further comprising a power processing unit electrically connected to the centrally located anode and to the cathode.

8. The pulsed plasma thruster of claim 7, wherein the power processing unit is electrically connected in parallel to a capacitor bank and to the centrally located anode and the cathode and wherein the capacitor bank is configured to lower an equivalent series resistance thereby raising discharge current and j×B thrust.

9. The pulsed plasma thruster of claim 8 wherein capacitor bank includes a plurality of low mass multi-layer ceramic capacitors formed in a parallel configuration to increase capacitance while maintaining low equivalent series resistance.

10. The pulsed plasma thruster of claim 7, wherein the fiber propellant is made of polytetrafluoroethylene.

11. The pulsed plasma thruster of claim 7 further comprising an insulated tube configured between the motor and the centrally located anode and further configured to communicate the fiber propellant from the motor to the centrally located anode.

12. The pulsed plasma thruster of claim 7, wherein the cathode is secured to an insulator end cap positioned about an exit end of the centrally located anode.

* * * * *